United States Patent [19]
Lance et al.

[11] Patent Number: 5,743,584
[45] Date of Patent: Apr. 28, 1998

[54] VEHICLE MOUNTED STORAGE UNIT

[75] Inventors: Sandra L. Lance, St. Charles; Marshall R. Lance, Geneva, both of Ill.

[73] Assignee: Geneva Manufacturing Co., S. Elgin, Ill.

[21] Appl. No.: 861,183

[22] Filed: May 21, 1997

Related U.S. Application Data

[63] Continuation of Ser. No. 457,875, Jun. 1, 1995, abandoned.

[51] Int. Cl.$^6$ .................................................. B60R 11/06
[52] U.S. Cl. ........................... 296/37.6; 312/311; 224/403
[58] Field of Search ........................ 296/37.6, 37.8, 296/37.16; 312/310, 311; 224/402, 403, 404, 488

[56] References Cited

U.S. PATENT DOCUMENTS

| | | | |
|---|---|---|---|
| 3,826,529 | 7/1974 | Wood | 296/37 R |
| 4,085,961 | 4/1978 | Brown | 296/37.6 |
| 4,889,377 | 12/1989 | Hughes | 296/3 |
| 4,898,284 | 2/1990 | Arens | 211/162 |
| 4,971,234 | 11/1990 | Hay | 224/42.32 |
| 5,015,025 | 5/1991 | Henriquez | 296/37.6 |
| 5,076,630 | 12/1991 | Henriquez | 296/37.6 |
| 5,121,306 | 6/1992 | Palmisano | 296/37.6 X |
| 5,232,259 | 8/1993 | Booker | 296/37.6 |
| 5,395,019 | 3/1995 | Christensen | 224/403 X |
| 5,398,987 | 3/1995 | Sturgis | 296/37.6 |

OTHER PUBLICATIONS

Sheets 1–6 (numbered in bottom right corner) transmitted to Marshall Lance by facsimile in Nov., 1994.
Sidewinder™ Tool Box advertisement. Author unknown. Time and place of publication unknown.

*Primary Examiner*—Joseph D. Pape
*Attorney, Agent, or Firm*—Marshall, O'Toole, Gerstein, Murray & Borun

[57] ABSTRACT

A vehicle-mounted storage unit for use with a vehicle having a rear door, comprising a cabinet having front and back portions, a door in the front portion of the cabinet, a locking device for the door, a mounting device attached to the floor of a vehicle, and mounting means for attaching the cabinet to the mounting device such that the mounting means is located inside the cabinet such that the mounting means may be accessed only if the door is open, wherein the storage unit is located adjacent to a door of the vehicle, and the door in the front portion of the cabinet opens toward the door of the vehicle.

6 Claims, 2 Drawing Sheets

VEHICLE MOUNTED STORAGE UNIT

This is a continuation of abandoned U.S. patent application Ser. No. 08/457,875 filed Jun. 1, 1995, now abandoned.

The present invention relates to a storage unit for installation in a vehicle and, more particularly, to a tool box for installation in a pickup truck, van, or sport utility vehicle.

BACKGROUND OF THE INVENTION

Tool boxes which are installed in work vehicles, such as pickup trucks, are known in the art. Such tool boxes generally open at the top, having a lid which may be lifted to access the contents of the tool box. These traditional tool boxes are usually installed along the sidewalls of the cargo area of the vehicle to permit the remainder of the cargo area to be used to carry cargo. To access the contents of these tool boxes, the user must then climb into the cargo area, or reach over the sidewall of the vehicle. Retrieving tools from these tool boxes by reaching over the sidewall or climbing into the vehicle may be difficult and physically strenuous. In addition, use of these traditional tool boxes may be impractical if the cargo area is covered because of the need for clearance to open the lid. Finally, traditional vehicle-mounted tool boxes are generally too large and heavy to be readily removed from the vehicle.

It is, therefore, an object of this invention to provide a vehicle-mounted tool box in which the contents may be accessed without reaching over the sidewalls or climbing into the vehicle.

It is a further object of this invention to provide a vehicle-mounted tool box which may be used in covered vehicles, such as vans and sport utility vehicles.

It is also an object of this invention to provide a vehicle-mounted tool box which may be readily removed from the vehicle and, alternately, may be secured to the vehicle to deter theft.

SUMMARY OF THE INVENTION

These objects and others are achieved by the vehicle-mounted storage unit of the present invention, which is comprised of a cabinet, having front and back portions, a door in the front portion of the cabinet which may be opened to provide access to the contents of the cabinet, a lock for the door, and means for removably mounting the cabinet to the vehicle when the door is open. The storage unit is mounted adjacent to a side or rear door, or the tailgate, of the vehicle.

Further objects, features, and advantages of the invention will become evident from a consideration of the following detailed description when taken in conjunction with the accompanying drawings and the appended claims.

BRIEF DESCRIPTION OF THE DRAWINGS

For the purpose of facilitating an understanding of the invention there are illustrated in the accompanying drawings preferred embodiments thereof, from an inspection of which, when considered in connection with the following description, the construction and operation of the invention, and many of its advantages, should be readily understood and appreciated.

DETAILED DESCRIPTION OF THE PREFERRED EMBODIMENT

Figure 1:
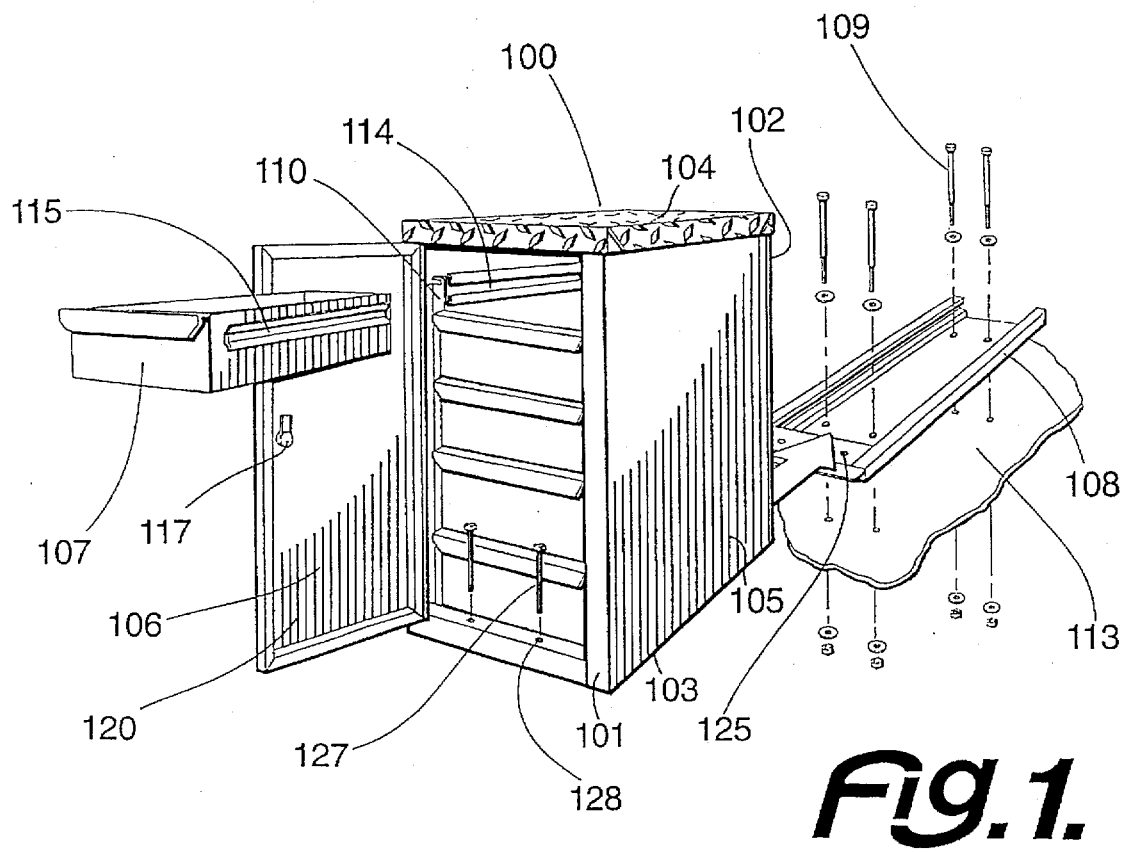
FIG. 1 is a perspective view of the storage unit of the present invention.
Figure 3:
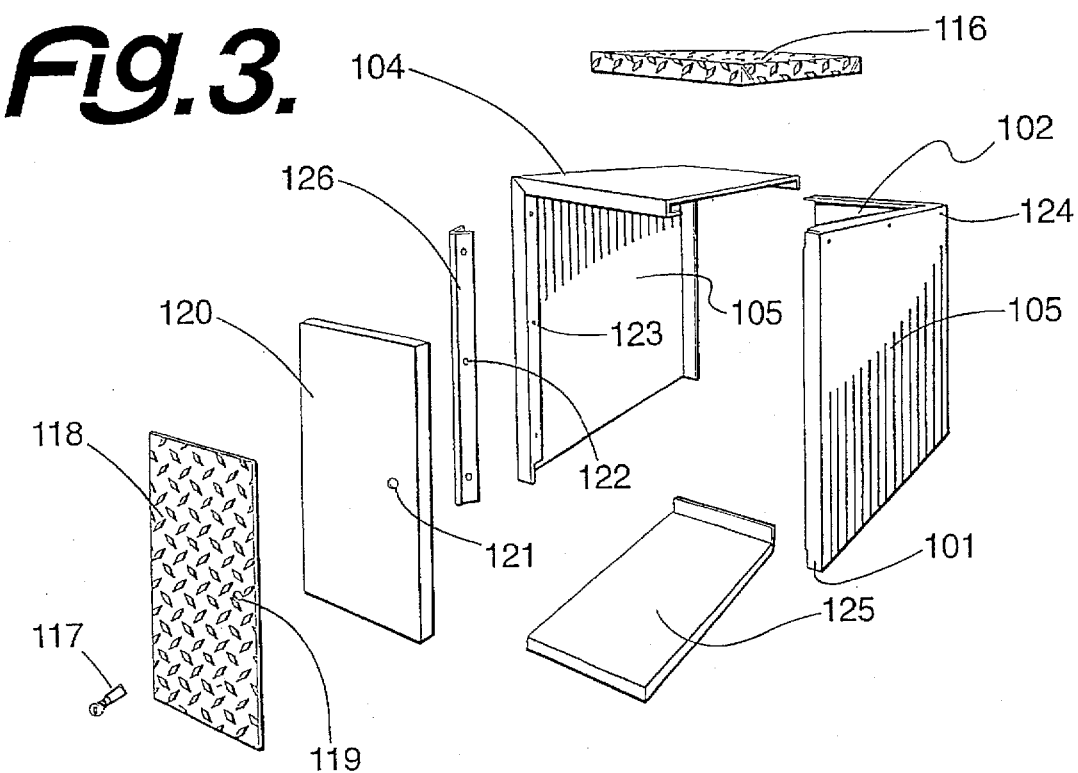
FIG. 3 is a fragmentary, perspective view of the cabinet of the storage unit.

The storage unit of the present invention is shown in FIGS. 1 and 3. As shown, the storage unit 100 comprises a cabinet 106 having a front 101, a back 102, a bottom 103, a top 104 and two sides 105. A door 120 in the front 101 provides access to the contents of the cabinet. As shown in FIGS. 1 and 3, the door 120 is mounted at holes 122 to a continuous hinge 126, which is mounted at holes 123 to the cabinet 106. A cam lock 117 mounted in the door 120 allows the cabinet 106 to be locked, thereby securing the contents.

The cabinet 106 may be mounted to the cargo area of a vehicle by attaching it to a mounting bracket 108, as shown in FIG. 1. The mounting bracket 108 may be bolted 109 or otherwise firmly attached to the floor 113 of the cargo area so that the mounting bracket may not be quickly and easily removed. The cabinet 106 may then be secured to the mounting bracket 108 by screws 127, which extend through holes 128 in the cabinet into holes 125 in the mounting bracket. Holes 128 are located inside of cabinet 106 such that screws 127 may be inserted or removed only if door 120 is open. This mounting arrangement allows the cabinet 106 to be easily detached and removed from the vehicle by simply removing the screws 127, but deters theft by preventing removal of the cabinet 106 when the door 120 is closed and locked.

The storage unit may be made of any of a variety of materials. In a preferred embodiment, the cabinet 106 is made of sheet metal, and the top 104 and door 120 are reinforced with aluminum tread plates 116 and 118. The lock 117 extends through the door 120, at hole 121, and through the aluminum tread plate 118, at hole 119. As shown in FIGS. 1 and 3, the panels are joined by rivets 124, but any known method may be used to join the panels. In a preferred embodiment, the top 104 and one side 105 are formed from a single piece of material, and the back 102 and second side 105 are formed from a single piece of material. This construction reduces production costs and results in a stronger cabinet.

Figure 2:
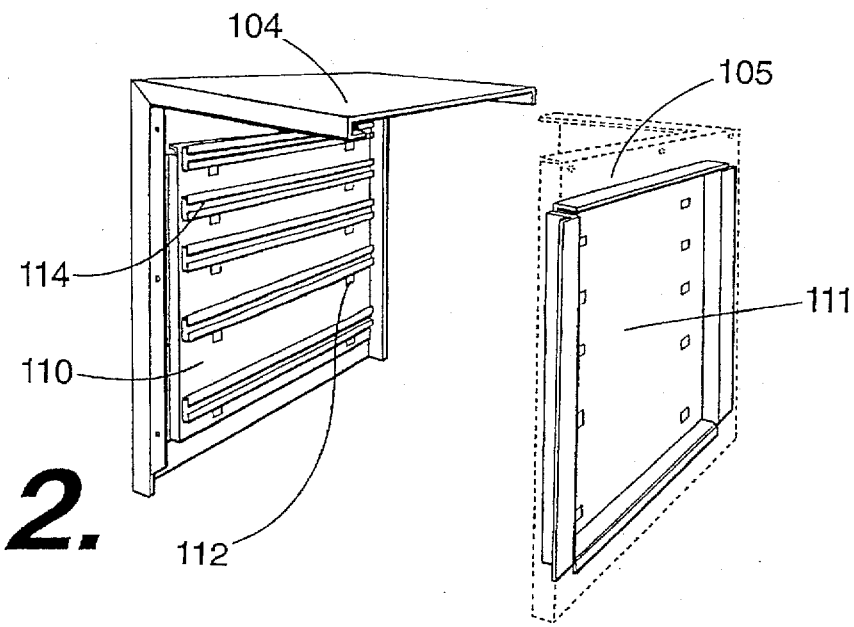
FIG. 2 is a fragmentary, perspective view of a portion of the interior of the cabinet of the storage unit.

The interior of the cabinet 106 may be fitted with drawers 107 to provide easier access to the contents of the cabinet 106. As shown in FIGS. 1 and 2, to accommodate drawers 107 the interior of the cabinet 106 may be fitted with side walls 111. The side walls may comprise a drawer slide mounting assembly 110 having slide rails 114 on which the drawers 107 may slide, and locating shear forms 112 on which the slide rails 114 may be mounted. Corresponding slide rails 115 may then be mounted on the drawers 107. In a preferred embodiment, the slide rails 114 permit the drawers 107 to be fully extended or removed from the cabinet 106, as shown in FIG. 1, so that the entire length of each drawer may be used.

Figure 4:
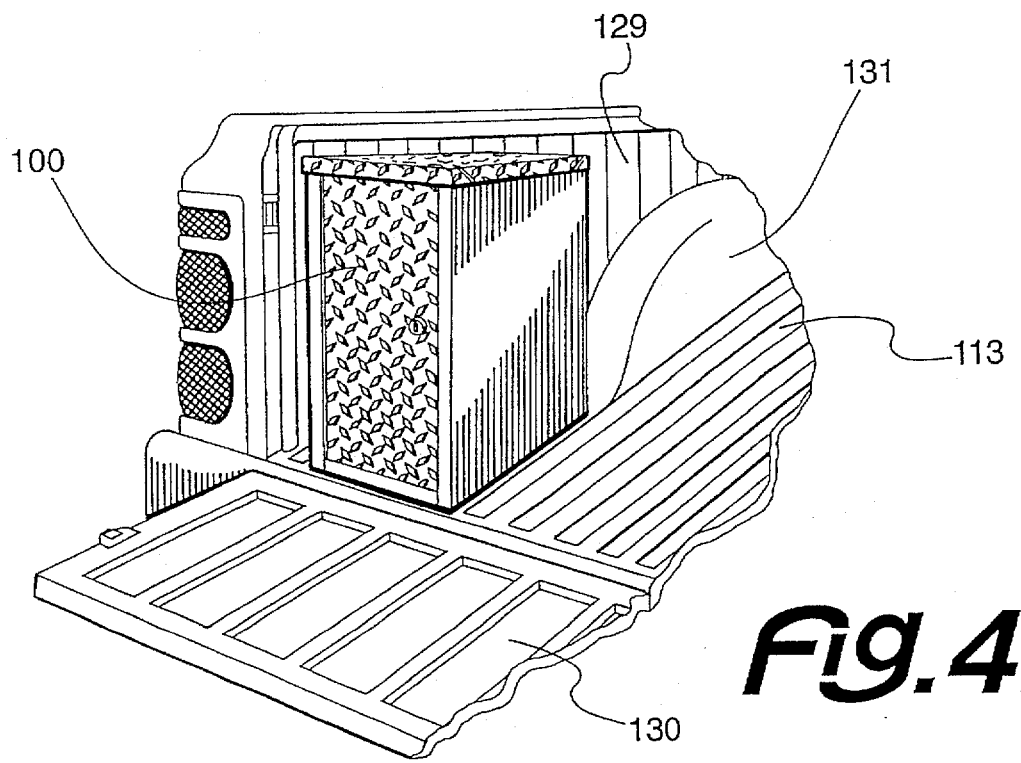
FIG. 4 is a perspective view of a vehicle in which the storage unit of the present invention is installed.

The storage unit 100 of the present invention may be mounted to the vehicle bed 113, as shown in FIG. 4, along the sidewall of the cargo area 129 behind the wheel well 131 and adjacent to the tailgate or rear 130 of the vehicle. In other types of vehicle, such as vans, the storage unit 100 may be mounted adjacent a rear or side door. These locations allow easy access to the contents of the storage unit, without reaching over the sidewall or climbing into the cargo area, and minimize interference with use of the cargo area for carrying cargo.

The invention has been described above in an illustrative manner and it is to be understood that terminology which has been used is intended to be in the nature of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. A vehicle mounted storage unit mounted to a rear bed of a pickup truck having a sidewall, a wheel well having a portion which extends outwardly from said sidewall by a first distance, and a tailgate that is movable between a closed position and an open position, said tailgate being spaced from a rear portion of said wheel well by a second distance, said sidewall of said pickup truck extending above said bed of said pickup truck by a height corresponding to a third distance, said vehicle mounted storage unit comprising:

a mounting bracket fixed to said bed of said pickup truck, said mounting bracket having a width that is less than said first distance and a length that is less than said second distance, said mounting bracket being fixed to said bed of said pickup truck at a mounting point adjacent said sidewall of said pickup truck and between said wheel well and said tailgate;

means for fixing said mounting bracket to said bed of said pickup truck at said mounting point;

a cabinet attached to said mounting bracket, said cabinet being removable from said mounting bracket and having a width not greater than said first distance, a length not greater than said second distance, and a height not greater than said third distance, said cabinet being disposed adjacent said sidewall of said pickup truck and between said wheel well and said tailgate of said pickup truck, with no portion of said cabinet extending outside of a hexahedral-shaped space defined by a first horizontal plane coinciding with said bed of said pickup truck, a second horizontal plane disposed at an elevation coinciding with a top portion of said sidewall, a first vertical plane coinciding with an interior portion of said sidewall of said pickup truck, a second vertical plane coinciding with said outwardly extending portion of said wheel well, a third vertical plane coinciding with said rear portion of said wheel well, and a fourth vertical plane coinciding with an interior portion of said tailgate;

a plurality of drawers disposed in said cabinet;

a plurality of drawer support members for supporting said drawers, at least one of said drawer support members supporting at least one of said drawers so that said one drawer is movable in a direction parallel to said first and second vertical planes between an open position and a closed position, a portion of said one drawer extending beyond said fourth vertical plane and outside of said hexahedral-shaped space when said one drawer is in its open position and when said tailgate is in its open position, said one drawer being disposed between said first and second vertical planes when said one drawer is in its open position, said portion of said one drawer not extending outside of said hexahedral-shaped space when said one drawer is in its closed position; and a door connected to said cabinet, said door being movable between an open position in which said drawers are exposed and a closed position in which said door covers said drawers, said door being oriented in a direction parallel to said third and fourth vertical planes when said door is in its closed position.

2. A vehicle mounted storage unit as defined in claim 1 additionally comprising a lock for locking said door connected to said cabinet.

3. A vehicle mounted storage unit mounted to a rear bed of a pickup truck having a sidewall, a wheel well having a portion which extends outwardly from said sidewall by a first distance, and a tailgate that is movable between a closed position and an open position, said tailgate being spaced from a rear portion of said wheel well by a second distance, said sidewall of said pickup truck extending above said bed of said pickup truck by a height corresponding to a third distance, said vehicle mounted storage unit comprising:

a cabinet fixed to said bed of said pickup truck, said cabinet having a width not greater than said first distance, a length not greater than said second distance, and a height not greater than said third distance, said cabinet being disposed adjacent said sidewall of said pickup truck and between said wheel well and said tailgate of said pickup truck, with no portion of said cabinet extending outside of a hexahedral-shaped space defined by a first horizontal plane coinciding with said bed of said pickup truck, a second horizontal plane disposed at an elevation coinciding with a top portion of said sidewall, a first vertical plane coinciding with an interior portion of said sidewall of said pickup truck, a second vertical plane coinciding with said outwardly extending portion of said wheel well, a third vertical plane coinciding with said rear portion of said wheel well, and a fourth vertical plane coinciding with an interior portion of said tailgate;

a plurality of drawers disposed in said cabinet;

a plurality of drawer support members for supporting said drawers, at least one of said drawer support members supporting at least one of said drawers so that said one drawer is movable in a direction parallel to said first and second vertical planes between an open position and a closed position, a portion of said one drawer extending beyond said fourth vertical plane and outside of said hexahedral-shaped space when said one drawer is in its open position and when said tailgate is in its open position, said one drawer being disposed between said first and second vertical planes when said one drawer is in its open position, said portion of said one drawer not extending outside of said hexahedral-shaped space when said one drawer is in its closed position; and a door connected to said cabinet, said door being movable between an open position in which said drawers are exposed and a closed position in which said door covers said drawers, said door being oriented in a direction parallel to said third and fourth vertical planes when said door is in its closed position.

4. A vehicle mounted storage unit as defined in claim 3 additionally comprising a lock for locking said door connected to said cabinet.

5. A vehicle mounted storage unit adapted to be mounted to a rear bed of a pickup truck having a sidewall, a wheel well having a portion which extends outwardly from said sidewall by a first distance, and a tailgate that is spaced from a rear portion of said wheel well by a second distance, said sidewall of said pickup truck extending above said bed of said pickup truck by a height corresponding to a third distance, said vehicle mounted storage unit comprising:

a cabinet having a width not greater than said first distance, a length not greater than said second distance, and a height not greater than said third distance, said cabinet being adapted to be disposed adjacent said sidewall of said pickup truck and between said wheel well and said tailgate of said pickup truck, with no portion of said cabinet extending outside of a hexahedral-shaped space defined by a first horizontal plane coinciding with said bed of said pickup truck, a second horizontal plane disposed at an elevation coinciding with a top portion of said sidewall, a first vertical plane coinciding with an interior portion of said sidewall of said pickup truck, a second vertical plane coinciding with said outwardly extending portion of said wheel well, a third vertical plane coinciding with said rear portion of said wheel well, and a fourth vertical plane coinciding with an interior portion of said tailgate;

a plurality of drawers disposed in said cabinet; and a plurality of drawer support members for supporting said drawers, at least one of said drawer support members supporting at least one of said drawers so that said one drawer is movable in a direction parallel to said first and second vertical planes between an open position and a closed position, a portion of said one drawer extending beyond said fourth vertical plane and outside of said hexahedral-shaped space when said one drawer is in its open position, said one drawer being disposed between said first and second vertical planes when said one drawer is in its open position, said portion of said one drawer not extending outside of said hexahedral-shaped space when said one drawer is in its closed position.

6. A vehicle mounted storage unit adapted to be mounted to a rear bed of a pickup truck having a sidewall, a wheel well having a portion which extends outwardly from said sidewall by a first distance, and a tailgate that is spaced from a rear portion of said wheel well by a second distance, said vehicle mounted storage unit comprising:

a cabinet having a width not greater than said first distance and a length not greater than said second distance, said cabinet being adapted to be disposed adjacent said sidewall of said pickup truck and between said wheel well and said tailgate of said pickup truck, with no portion of said cabinet extending outside of a space bounded by a first vertical plane coinciding with an interior portion of said sidewall of said pickup truck, a second vertical plane coinciding with said outwardly extending portion of said wheel well, a third vertical plane coinciding with said rear portion of said wheel well, and a fourth vertical plane coinciding with an interior portion of said tailgate;

at least one drawer disposed in said cabinet; and a plurality of drawer support members for supporting said drawer, said drawer support members supporting said drawer so that said drawer is movable in a direction parallel to said first and second vertical planes between an open position and a closed position, a portion of said drawer extending beyond said fourth vertical plane and outside of said bounded space when said drawer is in its open position, said drawer being disposed between said first and second vertical planes when said drawer is in its open position, said portion of said drawer not extending outside of said bounded space when said drawer is in its closed position.

* * * * *

US005743584B1

REEXAMINATION CERTIFICATE (4024th)

United States Patent [19]
Lance et al.

[11] B1 5,743,584
[45] Certificate Issued Mar. 21, 2000

[54] VEHICLE MOUNTED STORAGE UNIT

[75] Inventors: Sandra L. Lance, St. Charles; Marshall R. Lance, Geneva, both of Ill.

[73] Assignee: Geneva Manufacturing Co., S. Elgin, Ill.

Reexamination Request:
No. 90/005,201, Dec. 23, 1998

Reexamination Certificate for:
Patent No.: 5,743,584
Issued: Apr. 28, 1998
Appl. No.: 08/861,183
Filed: May 21, 1997

[51] Int. Cl.$^7$ .................................................. B60R 11/06
[52] U.S. Cl. ........................ 296/37.6; 312/311; 224/403
[58] Field of Search ................................ 296/37.6, 37.8, 296/37.16; 312/310, 311; 224/402, 403, 404, 488

[56] References Cited

U.S. PATENT DOCUMENTS

| | | | |
|---|---|---|---|
| D. 305,315 | 1/1990 | Fletcher | D12/157 |
| 3,826,529 | 7/1974 | Wood | 296/37 R |
| 4,085,961 | 4/1978 | Brown | 296/37.6 |
| 4,469,364 | 9/1984 | Rafi-Zadeh | 296/37.6 |
| 4,573,731 | 3/1986 | Knaack | 296/376 |
| 4,789,195 | 12/1988 | Fletcher | 296/37 |
| 4,889,377 | 12/1989 | Hughes | 296/3 |
| 4,898,284 | 2/1990 | Arens | 211/162 |
| 4,971,234 | 11/1990 | Hay | 224/42.32 |
| 5,015,025 | 5/1991 | Henriquez | 296/37.6 |
| 5,076,630 | 12/1991 | Henriquez | 296/37.6 |
| 5,121,306 | 6/1992 | Palmisano | 296/37.6 X |
| 5,232,259 | 8/1993 | Booker | 296/37.6 |
| 5,395,019 | 3/1995 | Christensen | 224/403 X |
| 5,398,987 | 3/1995 | Sturgis | 296/37.6 |

OTHER PUBLICATIONS

"Sidewinder" Too Box Advertisement 1994, Author Jeff Edwards and Jack Sturgis. One page, published in Texas 1994 and distributed by Scot Tools, (Sturgis patent licensee).

"Matco Tools", 1978 Catalog, prepared by Scott A. Darrah, pp. 10–11, published by Danner Press of Ohio, Canton, Ohio.

"Snap–On Tools", 1993 Catalog, prepared by Snap–On Tools Corp., Kenosha, Wisc. pp. 15 and 30.

"ScotBox" brochure 1995, Published by Scot Tools, Inc. and printed by Catalog King of of NY, One page.

"Lido Incorporated" catalog 1977 (current) published by same, a Texas company.

"American Van" catalog No. 64B (p. 31–35,46, 48), published by American Van E Equipment, of Lakewood, NJ.

"Betra" and "Comec" catalog pages, 1994 European catalog, English translation included.

Knaack, "Weather–Guard" 1997 catalog, pp. 47–48, published by Knaack Mfg., Crystal Lake, Il.

"Aero" 1989 catalog illustrating rear fender well truck boxes, Published by Aero, Mayville NY and Yorktown Industries flyer from 1968 which was an affiliate of Aero, Both have ceased operations.

Sidewiner™ Tool Box advertisement. Author unknown. Time and place of publication unknown.

Sheets 1–6 (numbered in bottom right corner) transmitted to Marshall Lance by facsimile in Nov., 1994.

*Primary Examiner*—Joseph D Pape

[57] ABSTRACT

A vehicle-mounted storage unit for use with a vehicle having a rear door, comprising a cabinet having front and back portions, a door in the front portion of the cabinet, a locking device for the door, a mounting device attached to the floor of a vehicle, and mounting means for attaching the cabinet to the mounting device such that the mounting means is located inside the cabinet such that the mounting means may be accessed only if the door is open, wherein the storage unit is located adjacent to a door of the vehicle, and the door in the front portion of the cabinet opens toward the door of the vehicle.

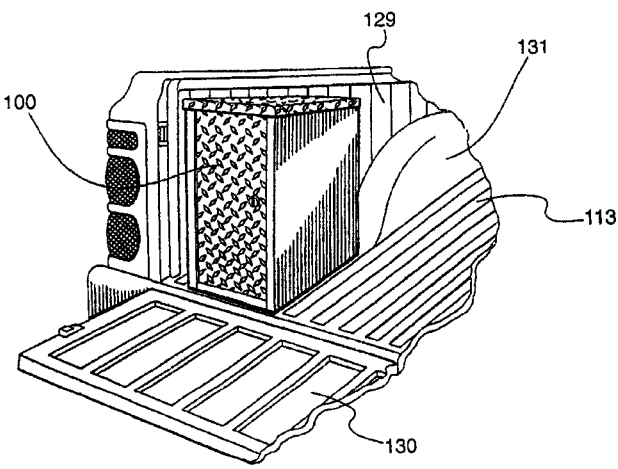

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *